United States Patent
Muench et al.

(10) Patent No.: US 10,173,662 B2
(45) Date of Patent: Jan. 8, 2019

(54) METHOD FOR DETERMINING A CONTROL PARAMETER OF A POWER OR TORQUE DISTRIBUTION REGULATOR FOR A HYBRID DRIVE OF A WORK MACHINE

(71) Applicant: Deere & Company, Moline, IL (US)

(72) Inventors: Philipp Muench, Kaiserslautern (DE); Florian Reinmuth, Sinsheim (DE); Thomas Floerchinger, Mannheim (DE); Barbara Boehm, Heidelberg (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/931,151

(22) Filed: Nov. 3, 2015

(65) Prior Publication Data
US 2016/0052506 A1    Feb. 25, 2016

Related U.S. Application Data

(63) Continuation of application No. PCT/EP2014/058216, filed on Apr. 23, 2014.

(30) Foreign Application Priority Data

May 7, 2013    (DE) ........................ 10 2013 208 320

(51) Int. Cl.
*B60W 10/08*    (2006.01)
*B60K 6/48*    (2007.10)
(Continued)

(52) U.S. Cl.
CPC ............... *B60W 10/08* (2013.01); *B60K 6/22* (2013.01); *B60K 6/48* (2013.01); *B60W 10/06* (2013.01);
(Continued)

(58) Field of Classification Search
USPC .......................................................... 701/22
See application file for complete search history.

(56) References Cited

U.S. PATENT DOCUMENTS 5,679,085 A * 10/1997 Fredriksen ............. B60K 17/28
475/76
6,059,380 A * 5/2000 Pueschel ................. B60T 8/175
303/113.2
(Continued)

FOREIGN PATENT DOCUMENTS

DE    102006010223    9/2007
EP    1832484    9/2007

OTHER PUBLICATIONS

Kessels, Koot, Van Den Bosh, and Kok, Online Energy Management for Hybrid Electric Vehicles, Nov. 2008, (13 pages), vol. 57, No. 6.
(Continued)

*Primary Examiner* — Hussein Elchanti
(74) *Attorney, Agent, or Firm* — Taft Stettinius & Hollister LLP; Stephen F. Rost

(57) ABSTRACT

A method for determining a control parameter of a power or torque distribution regulator for a hybrid drive of a work machine having the steps of automatically determining a work cycle that has just been performed by the work machine, and selecting of the control parameter as a function of the work cycle determined in the previous step.

18 Claims, 3 Drawing Sheets

(51) Int. Cl.
  *B60W 10/06* (2006.01)
  *B60W 20/11* (2016.01)
  *B60K 6/22* (2007.10)
  *B60W 20/00* (2016.01)
  B60W 50/08 (2012.01)
  B60W 50/00 (2006.01)

(52) U.S. Cl.
  CPC ......... *B60W 20/102* (2013.01); *B60W 20/11* (2016.01); *B60W 50/082* (2013.01); *B60W 2050/001* (2013.01); *B60W 2050/0075* (2013.01); *B60W 2050/0095* (2013.01); *B60W 2300/152* (2013.01); *B60W 2510/1005* (2013.01); *B60W 2510/30* (2013.01); *B60W 2520/10* (2013.01); *B60W 2540/10* (2013.01); *Y02T 10/6221* (2013.01); *Y02T 10/6286* (2013.01); *Y10S 903/93* (2013.01)

(56) References Cited

U.S. PATENT DOCUMENTS

| | | | | |
|---|---|---|---|---|
| 6,425,839 | B1* | 7/2002 | Koelle | F02N 11/04 180/65.235 |
| 8,214,097 | B2* | 7/2012 | Severinsky | B60H 1/004 180/65.21 |
| 2009/0084623 | A1* | 4/2009 | Dagenais | B60T 8/1706 180/210 |
| 2009/0314256 | A1* | 12/2009 | Bland | F02C 3/305 123/456 |
| 2010/0082192 | A1* | 4/2010 | Hofbauer | B60K 5/08 701/22 |
| 2010/0213757 | A1* | 8/2010 | Wagner | B60T 8/34 303/10 |
| 2011/0204712 | A1* | 8/2011 | Tarasinski | A01B 59/06 307/9.1 |
| 2012/0265389 | A1* | 10/2012 | Bissontz | B60K 6/48 701/22 |
| 2014/0156129 | A1* | 6/2014 | Tabata | B60K 6/48 701/22 |
| 2014/0230785 | A1* | 8/2014 | Kawaguchi | F02D 29/04 123/349 |
| 2014/0309079 | A1* | 10/2014 | Tabata | B60K 6/547 477/5 |
| 2015/0019060 | A1* | 1/2015 | Suzuki | B60W 10/26 701/22 |

OTHER PUBLICATIONS

Koot, Kessels, De Jager, Heemels, Bosch, and Steinbuch, Energy Management Strategies for Vehicular Electric Power Systems, May 2005, (12 pages), vol. 54, No. 3.

* cited by examiner

METHOD FOR DETERMINING A CONTROL PARAMETER OF A POWER OR TORQUE DISTRIBUTION REGULATOR FOR A HYBRID DRIVE OF A WORK MACHINE

RELATED APPLICATIONS

This application is a continuation application of International Application Serial No. PCT/EP2014/058216, which has an international filing date of Apr. 23, 2014, and which claims the benefit of German Application Ser. No. 102013208320.3, filed on May 7, 2013. The disclosures of these aforementioned applications are hereby expressly incorporated by reference in their entirety.

FIELD OF THE DISCLOSURE

The present disclosure relates to a method for determining a control parameter of a power or torque distribution regulator for a hybrid drive of a work machine and to a corresponding control device.

BACKGROUND

Hybrid drives for work machines comprise a combustion engine, a generator driven by a combustion engine, a charge storage device and an electric motor. The propulsion of the work machine or the driving of components driven by the work machine is ensured by a power train in which the driving torques of the combustion engine and of the electric motor are superposed by a summation gear, as a rule a planet gear, or they act jointly on a shaft. By distributing the driving power to the power provided by the combustion engine and the power provided by the charge storage device. Such hybrid drives provide an additional freedom in comparison to conventional drives, in which only the power of the combustion engine can be changed. In order to specify the torque of the combustion engine and the torque of the electric motor, or to distribute a power to be provided to the combustion engine and to the electric motor, different types of regulators are known to be used, and in particular proportional-integral regulators or heuristic regulators.

These so-called power or torque distribution regulators have to take into consideration other general conditions such as maintaining a certain charge in the charge storage device, and have to be optimized in the sense of an optimization of the overall level of efficiency. Since a preview of the future power need of the work machine is not possible, as would be required for an optimal regulator taking into consideration all the circumstances, control parameters of the regulators (referred to as suboptimal regulators) are specified in such a manner that they work with the most optimal level of efficiency possible for the power demand in the case of a predetermined cycle. Accordingly, in the case of a proportional-integral regulator, for example, the factors, with which the power demand is included proportionally and integrally in the output value for the distribution of a power to be provided to the combustion engine and to the electric motor, are optimized for the predetermined cycle.

Work machines usually run through different work cycles in the context of the activities to be performed. For example, when spreading manure the load is relatively low, in the case of bale pressing the load is cyclical, alternating between a relatively low and relatively high load, and for plowing the load is relatively high. The adaptation of the control parameter of the regulator is not optimal for all work conditions or states.

In one known example, a method is provided for the adaptive control of a hybrid vehicle whose combustion engine drives a generator which in turn supplies a charge storage device and an electric motor, the latter alone being used to propel the vehicle. A controller compares a work procedure with a stored reference work procedure in order to determine in which load category the hybrid vehicle is being operated and selects a current control curve and a current rise curve for the operation of the electric motor as a function of the respective load category. The user can additionally specify which task is to be accomplished at a given time, and the controller selects the respective load category as a function of the task. Accordingly, on the one hand, a manual input for the respective cycle may be used and, on the other hand, only the current uptake of the electric motor is controlled; thus no adaptation of the control parameters of a regulator occurs.

Thus, a need exists for refining a method for determining a control parameter of a power or torque distribution regulator for a hybrid drive of a work machine and of a corresponding power or torque distribution regulator.

SUMMARY

In one embodiment. the method according to this disclosure for determining a control parameter of a power or torque distribution regulator for a hybrid drive of a work machine may have the following steps: (a) automatic determination of a work cycle that has just been performed by the work machine, and (b) selection of the control parameter as a function of the work cycle determined in step (a).

In other words, one first determines in what work cycle the work machine is at a given time. For this purpose, for example, a classification of measured values acquired by sensors occurs on the basis of pattern recognition by a classification algorithm. The classification algorithm can use procedures which themselves are known such as, for example, a Bayes classifier, a nearest neighbor classifier, a k-nearest neighbor classifier, distance functions, or decision trees. The measured values relate in particular to the speed, a transmission ratio of a manual transmission, the condition of a power take-off shaft, or data transmitted via a data bus. As soon as the current work cycle is known, then at least one control parameter associated with this work cycle is selected and used by the power or torque distribution regulator for the distribution of a power (or torque) to be provided to the combustion engine and to the electric motor. By changing the control parameters, the dynamic behavior of the power or torque distribution regulator may be improved.

In one example, the control parameter is in particular a factor by means of which the respective torque or power demand is included proportionally or integrally in the output value of the power or torque distribution regulator, implemented as a proportional-integral regulator.

In another example the work machine in which the power or torque distribution regulator is used may be provided with a combustion engine, a generator which can be driven by the combustion engine, a charge storage device, an electric motor, and a power train having a summation gear in driving connection with the combustion engine and the electric motor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
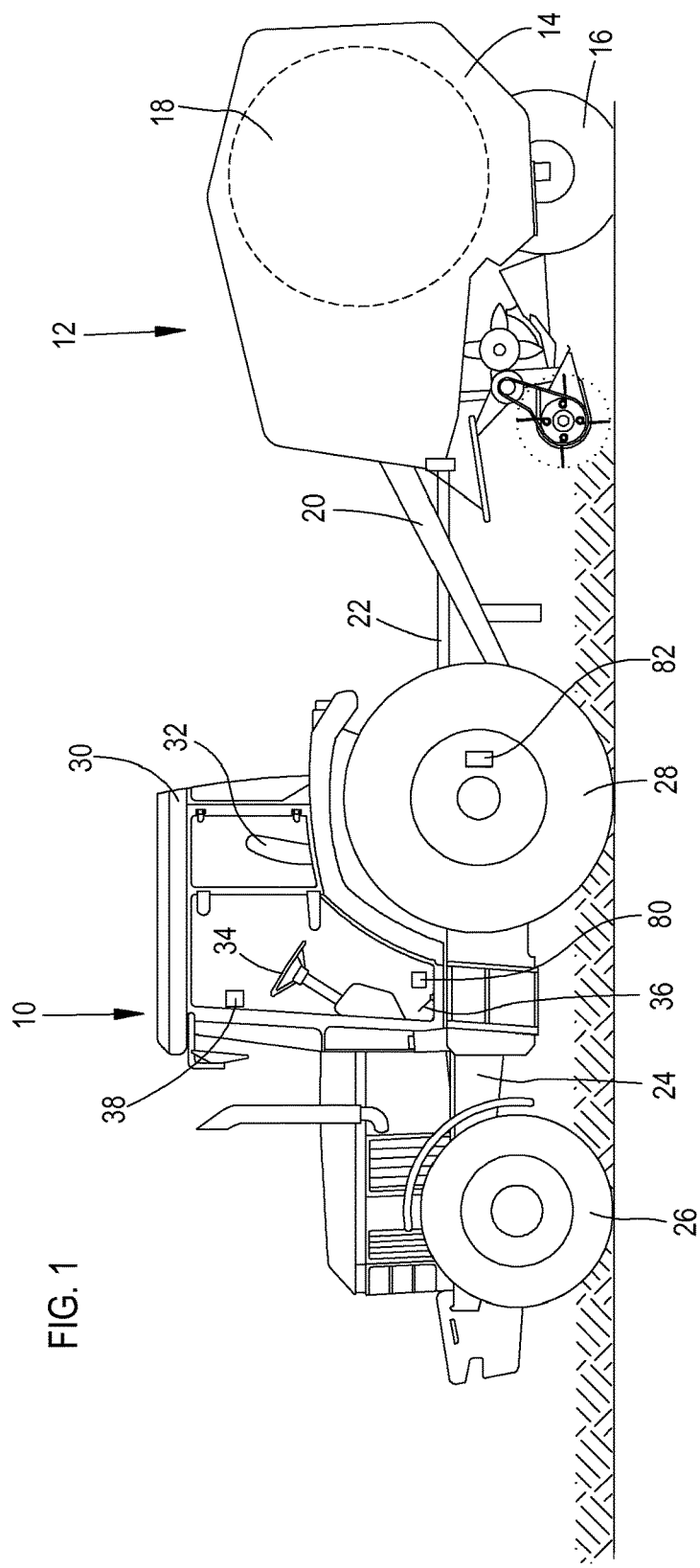
FIG. 1 is a side view of an agricultural work machine in the form of a tractor with a pulled bale press.

FIG. 1 shows an agricultural work machine in the form of a tractor 10 and a round bale press 12 pulled by the tractor 10. The round bale press 12 in itself is conventional and has a vehicle chassis 14 supported on wheels 16, with a bale formation chamber 18. The round bale press 12 via a drawbar 20 is pulled by the tractor 10, and its elements that can be driven are driven by a power take-off shaft 22 of the tractor 10. The tractor 10 has a vehicle chassis 24 which is supported on front steerable wheels 26 and rear driven wheels 28. An operator workplace with a seat 32 is located in a cabin 30. From the cabin, a steering wheel 34, a gas pedal 36 and an operator interface 38 with a display device and keys or the touch sensitive display device can be activated.

Figure 2:
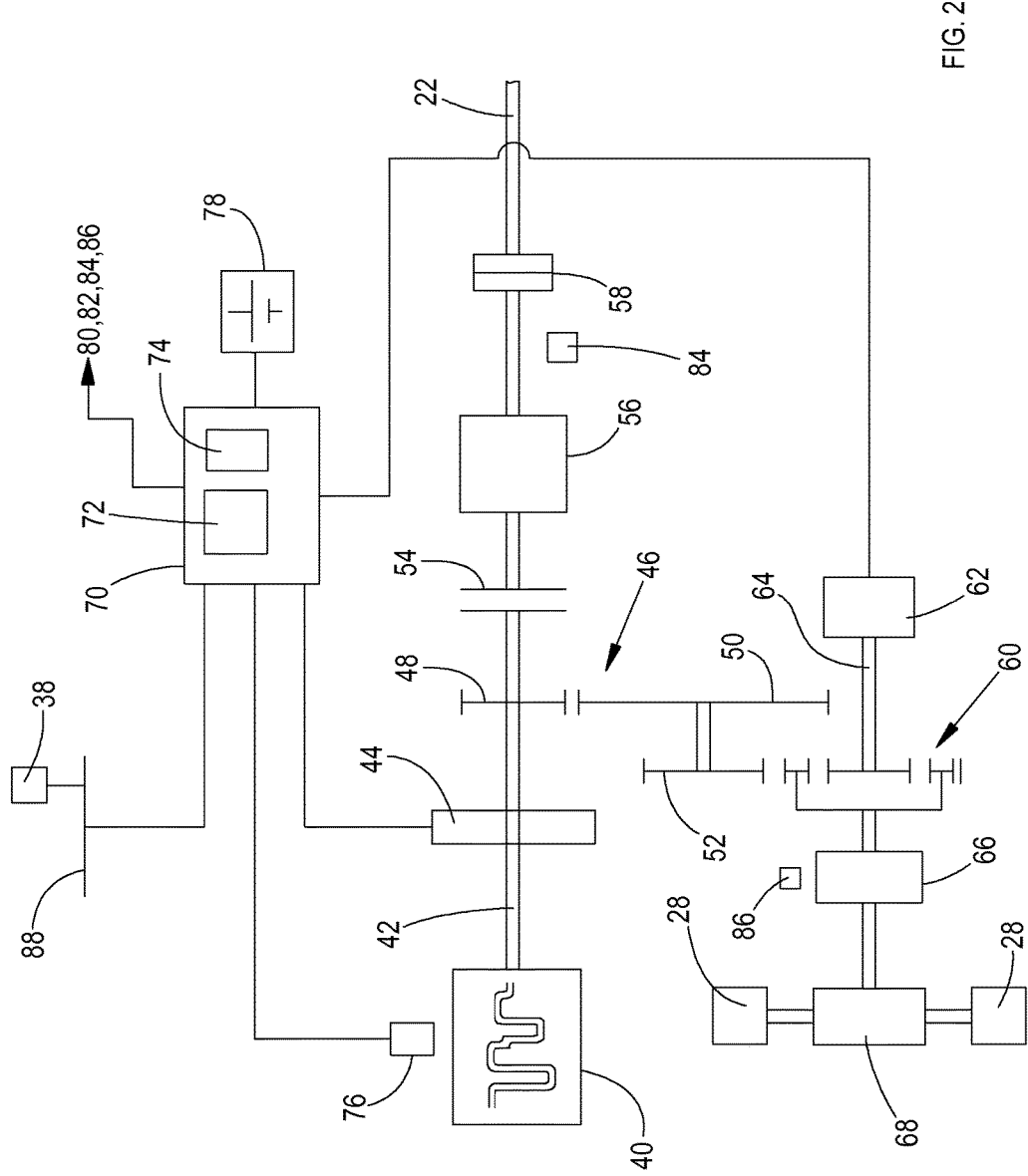
FIG. 2 is a diagram of the power train of the work machine and the associated control.

FIG. 2 shows the power train of the work machine. The crankshaft of a combustion engine 40 implemented as a rule as a diesel engine drives (as a rule via a separating clutch, not indicated) a shaft 42 which itself drives an electric generator 44, an intermediate gear 46 with gear wheels 48, 50 and 52 as well as the input side of a power take-off shaft separating clutch 54. On the output side, the power take-off shaft separating clutch 54 is connected to an input of a power take-off shaft gear 56 which, on the output side, drives a power take-off shaft separating clutch 58, and on which the power take-off shaft 22 of the round bale press 12 is coupled in a manner so that it can be taken off. On the output side, the intermediate gear 46 is connected to a summation gear 60 which is implemented in the form of a planet gear whose ring wheel engages with the output gear wheel 52 of the intermediate gear 52 and whose sun gear is connected to the power take-off shaft 64 of an electric motor 62. The planet gear carrier is coupled to the input side of a manual transmission 66 which, on the output side, drives the rear wheels 28 via a differential gear 68.

In another embodiment, the power take-off shaft gear 56 can also be driven downstream of the summation gear 60. In addition, the manual transmission 66 can be implemented as a power shift transmission, all the others are manual. In yet another embodiment, the summation gears 60 can be associated with the individual wheels 28 and optionally also the front wheels 26. In a further embodiment, the electric motor 62 can transfer its torque directly or via a gear to the shaft 42 or another site of the power train, i.e., the summation gear 60 could then be omitted and the electric motor 62 could fulfill the function of the generator 44. In yet another embodiment, all of the mechanical power could be generated by the electric motor 62, wherein then the maximum powers of the generator 44 and of the electric motor 62 would have to be increased, since the mechanical driving branch is omitted.

A control device 70 may have a power or torque distribution regulator 72 and a condition acquisition device 74 and is electrically connected to the generator 44, a combustion engine controller 76, a charge storage device 78 in the form of an accumulator (or a high-capacity capacitor or the like) and the electric motor 62. Moreover, the control device 70 is coupled to a sensor 80 for the acquisition of the position of the gas pedal 36, a speed sensor 82 for the acquisition of the rotational speed of one rear wheel or of the two rear wheels 28, a sensor for the acquisition of the rotational speed of the input side of the power take-off shaft coupling 58, a sensor 86 for the acquisition of the transmission ratio of the manual transmission 66 and a data bus 88 to which, among other parts, the operator interface 38 implemented as a virtual terminal is connected.

In operation, the operator specifies via the gas pedal 36 a desired speed of the tractor 12, which is transmitted via the sensor 80 to the control device 70, which activates the combustion engine controller 76 and the electric motor 62 as a function of signals of the power or torque distribution regulator 72. Depending on the specifications of the power or torque distribution regulator 72, the control device 70 takes electrical power from the charge storage device 78 in order to drive the electric motor 62 or it charges the charge storage device 78 with electrical power from the generator 44 or with EMF recovered from the electric motor 62. The manual transmission 66 can be shifted manually by the operator via a lever mechanism or automatically by the control device 70 or via the operator interface 38 and an actuator (not shown) controlled by the control device 70. The power take-off shaft separating clutch 54 can be shifted via a mechanism by the operator or via the operator interface 38 or a separate switch or an actuator (not shown) controlled by the control device 70.

For details regarding the structure and the mode of operation of the power or torque distribution regulator 72, reference is made to the publication by Michiel Koot, J. T. B. A. Kessels, Bram de Jager, W. P. M. H. Heemels, P. P. J. van den Bosch, and Maarten Steinbuch: Energy management strategies for vehicular electric power systems, IEEE Transactions on Vehicular Technology, 54(3):771-782, 2005, and John T. B. A. Kessels, Michiel W. T. Koot, Paul P. J. van den Bosch, and Daniel B. Kok: Online energy management for hybrid electric vehicles, IEEE Transactions on Vehicular Technology, 57(6):3428-3440, 2008, the disclosures of which are hereby incorporated by reference in their entirety.

Figure 3:
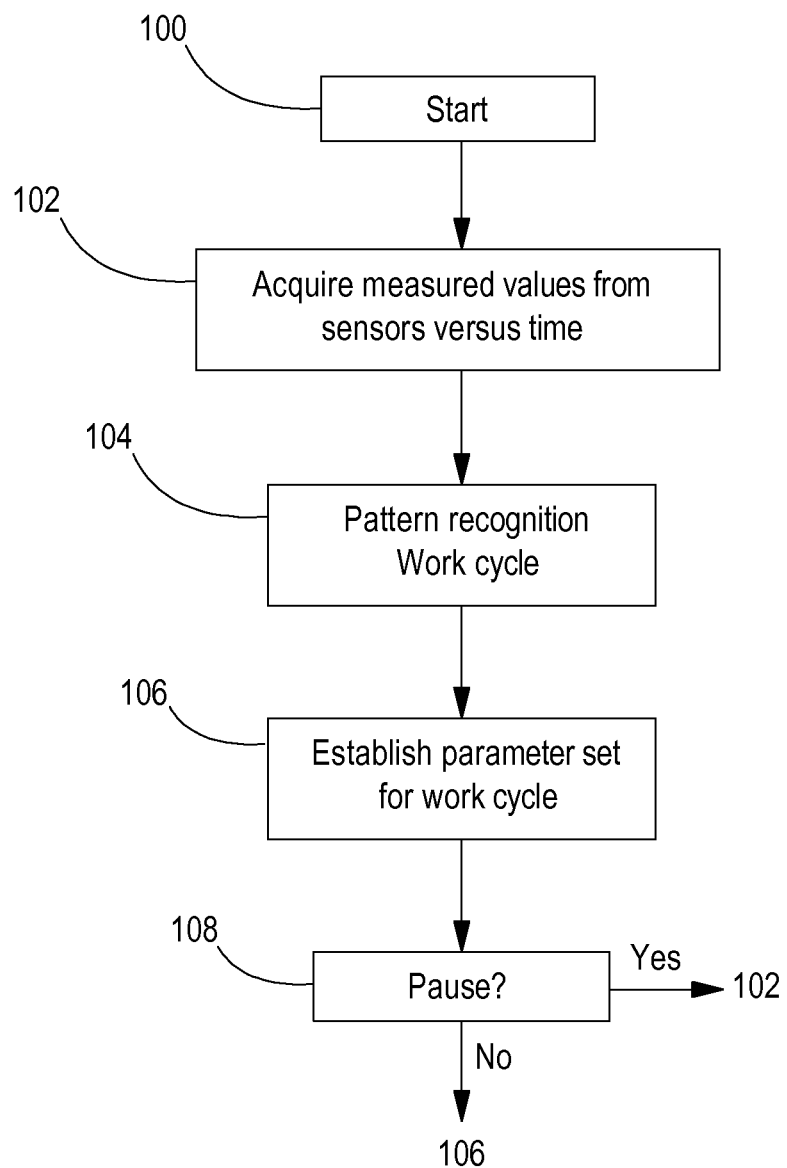
FIG. 3 is a flow diagram according to which the control works.

The power or torque distribution regulator 72 is implemented as a proportional-integral regulator and uses control parameters that are a function of the respective activity performed by the work machine. Here, the procedure is in accordance with the flow diagram of FIG. 3.

After the start in step 100, in which an initialization takes place, step 102 follows, in which, by means of the condition acquisition device 74, measured values are acquired by sensors over a certain time period and stored. These are measured values from the sensors 80 (for the gas pedal 36), 82 (for the speed of the tractor 10), 84 (for the rotation condition of the power take-off shaft coupling 58), and 86 (for the transmission ratio of the manual transmission 66). Furthermore, any desired data can be acquired by the data bus 88, which can include, for example, an identification of an additional apparatus which may be connected to the data bus 88 (for example, manure distributor, plow or bale press, etc.) or data on the activation of the additional apparatus.

In step 104, the stored measured values are evaluated by the condition acquisition device 74 in order to recognize a pattern from which the current work cycle of the work machine can be derived. For this purpose, any desired algorithms can be used such as a Bayes classifier, a nearest neighbor classifier, a k-nearest neighbor classifier, distance functions or decision trees. On this topic, reference is made, for example, to the disclosure of DE 10 2012 220 109 A1 and the prior art cited therein (Sebastian Blank, Georg Kormann, Karsten Berns: A Modular Sensor Fusion Approach for Agricultural Machines, XXXVI CIOSTA & CIGR Section V Conference, June 2011), the disclosures of which are hereby incorporated by reference in their entirety. The current work cycle is selected accordingly from several known work cycles.

For example, the work cycle of the work machine will be "transport travel" if the manual transmission 66 (acquired with the sensor 86) is at a higher transmission ratio and the speed (acquired with the sensor 82) is higher than a threshold of 15 km/h, for example. Analogously, the work cycle of the work machine will be "soil processing" if the speed is below a threshold of 5 km/h, for example, and the power of the combustion engine 40 (transmitted by the combustion engine controller 76 to the condition acquisition device 74) is above a threshold value of 60% of its nominal power, for example. A "bale pressing" work cycle can be recognized on the basis of frequently changing loads of the combustion engine 40 or on the basis of an identification of a bale press via the data bus 88 in connection with the condition of the outlet shaft coupling 58 (sensor 84). A "loader work" work cycle can be recognized on the basis of an activation of a front loader via the data bus 88 or frequent direction change (sensor 82).

Step 106 then follows, in which the condition acquisition device 74 transmits a signal pertaining to the current work cycle to the power or torque distribution regulator 72, and the power or torque distribution regulator 72 uses a parameter set associated with the work cycle for the regulation of the load distribution to the combustion engine 40 and to the electric motor 62. This parameter set can have a factor by means of which the given current power demand (known to the control device 70, for example, on the basis of the position of the gas pedal 36 acquired with the sensor 80 and the power values of the combustion engine 40, the generator 44 and the electric motor 62) is included proportionally in the output value, for the regulation of the torque or a load distribution to the combustion engine 40 and to the electric motor 62, of the power or torque distribution regulator 72 implemented as a proportional-integral regulator. The parameter set can also have a factor by means of which the respective torque or power demand is included integrally in the output value of the power or torque distribution regulator 72 implemented as a proportional-integral regulator. In this manner one achieves that, in a "transport travel" work cycle, the load change procedures take place more slowly than in a "bale pressing" work cycle, for example. The parameter set can also be selected by the condition acquisition device 74 or another part of the control device 70.

During steps 102 to 106, i.e., as long as the current work cycle is not yet known, the power or torque distribution regulator 72 works with a predetermined standard parameter set.

Step 108 follows, in which verification is carried out to determine whether the work machine had a longer pause precisely at that moment (for example, longer than 30 s). Such a pause suggests a possible change in the work cycle. If this is not the case, the procedure is continued with step 106 again, i.e., the work cycle existing so far and the associated parameter set continue to be used, and otherwise, step 102 follows again, in order to determine the work cycle anew.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for determining a control parameter of a load distribution regulator for a hybrid drive of a work machine, the method comprising:
    providing an engine having a shaft, a generator coupled to the shaft, at least one drive wheel, an intermediate gear set coupling the shaft to the drive wheel through a summation gear set, an electric motor coupled to a sun gear of the summation gear set, a power take-off, a plurality of sensors, and a control device, the control device including the load distribution regulator and an acquisition device;
    measuring performance values of the work machine with the plurality of sensors;
    automatically determining a work cycle by the control device performed by the work machine as a function of the measured performance values; and
    determining the control parameter by the load distribution regulator as a function of the work cycle determined in the automatically determining step;
    wherein, the measuring performance values step includes measuring a rotation condition of the power take-off, a speed of the work machine, and a power value of the engine;
    further wherein, the controller identifies a soil processing work cycle when the speed of the work machine is less than a speed threshold and the power value of the engine is greater than a power value threshold.

2. The method of claim 1, further comprising determining the work cycle based on the measured performance values detected by sensors on the basis of a pattern recognition by a classification algorithm executed by the control device.

3. The method of claim 2, wherein the classification algorithm is executed by the control device using a Bayes classifier, a nearest neighbor classifier, a k-nearest neighbor classifier, or distance functions.

4. The method of claim 2, further comprising detecting the measured performance values as a function of the speed of the work machine, transmission ratio of a manual transmission, and historic load conditions of the engine.

5. The method of claim 1, wherein:
    the load distribution regulator comprises a proportional-integral regulator and outputs a load value; and
    the control parameter comprises a factor of a load demand used by the load distribution regulator which is proportionally or integrally a portion of the load value output by the load distribution regulator.

6. The method of claim 1, further comprising operably controlling the load distribution regulator via a predetermined standard parameter set if the work cycle is undetermined.

7. The method of claim 1, further comprising:
initiating a waiting period for a predetermined period of time; and
determining via the acquisition device if the work machine is performing a new work cycle during the waiting period.

8. The method of claim 1, further comprising:
selecting by the load distribution regulator a parameter set associated with the work cycle determined by the acquisition device; and
controlling a load distribution output to the engine and electric motor as a function of the parameter set.

9. The method of claim 1, further wherein the measuring performance values of the work machine step comprises measuring at least one of a manure distributor, a plow, or a bale press.

10. The method of claim 1, wherein the measuring performance values of the work machine step comprises transmitting data via a data bus.

11. The method of claim 1, further wherein the work cycle is a loader work cycle if the measuring performance values of the work machine step indicates frequent direction change.

12. A control system for a hybrid drive of a work machine, the working machine including an engine, an electric motor, a drive wheel, an additional apparatus or a power take-off, and a generator, comprising:
an intermediate gear set rotationally coupled to the engine, the generator rotationally coupled to the engine between the intermediate gear set and the engine;
a summation gear set rotationally coupling the electric motor to the drive wheel, the summation gear set positioned at least partially between the intermediate gear set and the drive wheel;
a control device for controlling the work machine;
a power distribution regulator of the control device disposed in electrical communication with the generator and the electric motor;
a condition acquisition device of the control device disposed in communication with the power distribution regulator, the condition acquisition device configured to determine a work cycle performed by the work machine, and
a plurality of sensors disposed in communication with the control device, each of the plurality of sensors configured to detect a performance value of the work machine;
wherein, the condition acquisition device determines the work cycle as a function of each performance value detected by each of the plurality of sensors;
further wherein, the power distribution regulator determines a control parameter as a function of the work cycle for the regulation of a load distribution to the engine and electric motor;
further wherein, the plurality of sensors determine the performance value of the power take-off, a speed of the work machine, and a power value of the engine;
further wherein the control device identifies a soil processing work cycle when the speed of the work machine is less than a speed threshold and the power value of the engine is greater than a power value threshold;
further wherein, the electric motor is controlled independently from the generator.

13. The control system of claim 12, wherein:
a classification algorithm is stored in the control device; and
the condition acquisition device operably determines the work cycle as a function of the performance values detected by the plurality of sensors on the basis of pattern recognition by the classification algorithm wherein a bale pressing work cycle is identified when the plurality of sensors indicate frequently changing loads on the engine.

14. The control system of claim 13, wherein the plurality of sensors are configured to detect performance values including a transmission ratio of a manual transmission, a condition of a power take-off shaft, and data transmitted via a data bus.

15. The control system of claim 12, further comprising:
an engine controller disposed in electrical communication with the control device;
a charge storage device disposed in electrical communication with the control device; and
a databus electrically coupled to the control device.

16. The control system of claim 12, further wherein the additional apparatus comprises a manure distributor, a plow, or a bale press.

17. The control system of claim 12, further wherein the performance of the additional apparatus is data transmitted via a data bus.

18. The method of claim 17, further wherein the work cycle is a bale pressing work cycle when the control device identifies frequently changing loads on the engine.

* * * * *